United States Patent
Zhai et al.

(10) Patent No.: US 11,574,020 B1
(45) Date of Patent: Feb. 7, 2023

(54) IDENTIFYING SIMILAR CONTENT IN A MULTI-ITEM EMBEDDING SPACE

(71) Applicant: Pinterest, Inc., San Francisco, CA (US)

(72) Inventors: Andrew Huan Zhai, San Mateo, CA (US); Kaifeng Chen, San Mateo, CA (US); Charles Joseph Rosenberg, Cupertino, CA (US)

(73) Assignee: Pinterest, Inc., San Francisco, CA (US)

( * ) Notice: Subject to any disclaimer, the term of this patent is extended or adjusted under 35 U.S.C. 154(b) by 57 days.

(21) Appl. No.: 16/712,140

(22) Filed: Dec. 12, 2019

(51) Int. Cl.
*G06F 16/9038* (2019.01)
*G06F 16/958* (2019.01)
*G06F 16/9032* (2019.01)
*G06F 16/84* (2019.01)

(52) U.S. Cl.
CPC .......... *G06F 16/9038* (2019.01); *G06F 16/84* (2019.01); *G06F 16/9032* (2019.01); *G06F 16/958* (2019.01)

(58) Field of Classification Search
CPC . G06F 16/9038; G06F 16/9032; G06F 16/958
See application file for complete search history.

(56) References Cited

U.S. PATENT DOCUMENTS

| | | | | |
|---|---|---|---|---|
| 2007/0217676 A1* | 9/2007 | Grauman | ............. | G06K 9/6212 382/170 |
| 2010/0271494 A1* | 10/2010 | Miyasako | ............... | G06T 7/215 348/208.1 |
| 2011/0191374 A1* | 8/2011 | Bengio | ................... | G06F 16/50 707/780 |
| 2020/0285687 A1* | 9/2020 | Zhang | ................. | G06F 16/9538 |

* cited by examiner

*Primary Examiner* — Taelor Kim
(74) *Attorney, Agent, or Firm* — Athorus, PLLC

(57) ABSTRACT

Systems and methods for identifying content for an input query are presented. A mapping model is trained to map elements of an input query embedding vector for a received query into one or more elements of a destination embedding vector. In response to receiving an input query, an input query embedding vector is generated that projects into an input query embedding space. The input query embedding vector is processed by the mapping model to map the input query embedding vector into one or more elements of a destination embedding vector in a destination embedding space, resulting in a partial destination embedding vector. Items of a corpus of content are projected into the destination embedding space and the partial destination embedding vector is also projected into the destination embedding space. A similarity measure determines the most-similar items to the partial destination embedding vector and at least some of the most-similar items are returned in response to the input query.

14 Claims, 10 Drawing Sheets

IDENTIFYING SIMILAR CONTENT IN A MULTI-ITEM EMBEDDING SPACE

BACKGROUND

More and more people are interacting with network-accessible online services. At least some of these online services provide its users/subscribers the ability to post content items, create collections of content items, and share these with other users. Often, these posted content items comprise a group or collection of distinct items: e.g., an image, a title for that image, one or more captions regarding the image, user comments regarding the image, and the like.

To keep users engaged with the online service, as a user posts content to the online service, interacts with posted content, etc., additional, related content is often presented to the user as a recommendation. Also, in response to a query to the online service from a user, related content is identified and presented to that user. Simply put, an online service is often trying to identify related content items for presentation to a user.

Identifying related items to a user's content post, especially a content post of multiple, distinct content items, or to a user's query presents significant challenges for online services.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

Figure 1:
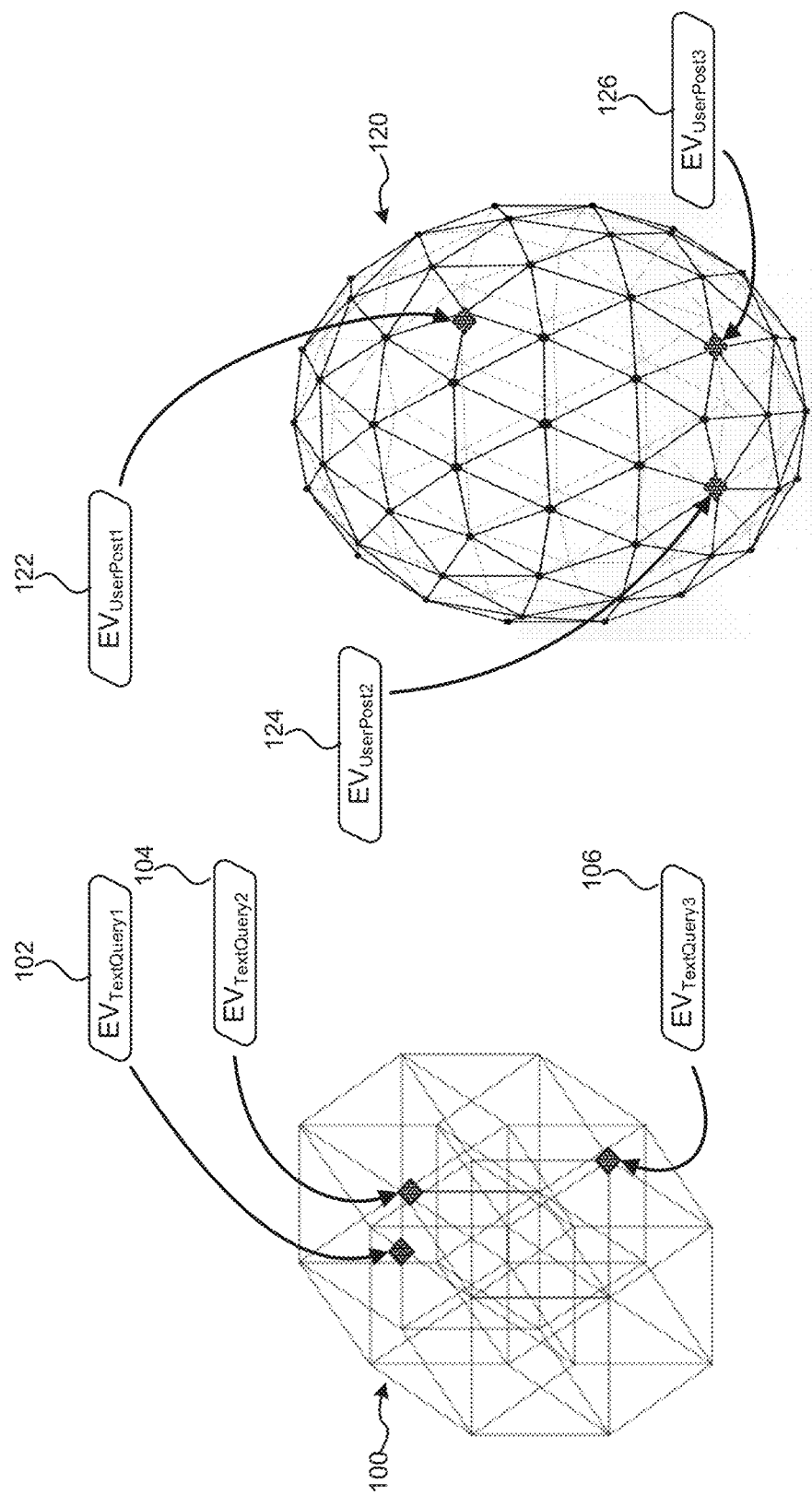
FIG. 1 is a pictorial diagram for illustrating embedding vectors of distinct types projected into embedding vector spaces.

In accordance with various aspects and embodiments of the disclosed subject matter, a computer-implemented method for identifying content recommendations from a multi-item embedding space for a single-item embedding vector is presented. In some examples, a mapping model is trained to map elements of an embedding vector of a query item of a received query to one or more elements of a multi-item embedding vector. According to various embodiments of the disclosed subject matter, the mapping model is a machine learning model suitably configured to be trained in this manner. In addition to training a mapping model, a corpus of content groups is maintained. Each content group comprises a plurality of individual content items, and each content group is associated with a corresponding multi-item embedding vector of a multi-item embedding space, generated from the individual content items of a corresponding content group. With the mapping model trained, recommended content items can be identified and provided in response to receiving a query, where the recommended content is viewed as being related and/or similar to the query. Regarding the received query, the query comprises at least a first content item, and the query does not comprise the exact same collection of content items as the plurality of individual content items of a content group. A query embedding vector is generated for the received content item and elements of the query embedding vector are mapped to one or more elements of a multi-item embedding vector of the multi-item embedding space (corresponding to the content groups), resulting in a partial multi-item embedding vector for the query. Content groups from the corpus of content groups are projected into the multi-item embedding space using the corresponding embedding vectors of the content groups. A subset of the projected content groups are selected, where the content groups of the subset have the greatest similarity to the received query, as determined by a similarity measure in the multi-item embedding space between the projected partial multi-item embedding vector for the received query and the projected multi-item embedding vectors of the corresponding projected content groups within the multi-item embedding space. At least some content groups of the subset of the projected content groups are provided as a response to recommended content to the received query.

In accordance with additional aspects and embodiments of the disclosed subject matter, computer-executable instructions, embodied on computer-readable media, for conducting a method for identifying content recommendations in response to a query, are presented. Indeed, as part of the method, a corpus of content items of a destination item type is maintained. Each content item of the corpus is associated with an embedding vector that projects the corresponding content item into a destination content type embedding space. A query is received, where the query comprises at least a first content item of a first content type. A mapper model is selected, where the mapper model is suitably trained to map an input query embedding vector to one or more elements of a destination content type embedding vector of the destination content type embedding space. An input query embedding vector is generated for the at least first content item of the query. The input query embedding vector is generated for an embedding space of the at least first content type. The input query embedding vector is then mapped to one or more elements of a destination content type embedding vector according to the identified mapping of the trained mapping model that results in a partial destination content type embedding vector for the query. The partial destination content type embedding vector for the query is projected into the destination content type embedding space. Additionally, at least some of the content items of the corpus of content items are also projected into the destination content type embedding space according to the corresponding destination content type embedding vectors of the projected content items. A subset of the projected content items that have a greatest similarity to the received query are selected according to a similarity measure in the destination content type embedding space, and at least some content items of the subset of the projected content items are provided as a response to the received query.

In accordance with additional aspects and embodiments of the disclosed subject matter, a computing system that provides content item recommendations in response to a query is presented. In execution, the computing system is configured to train a mapping model to identify a mapping by which the mapping model maps an embedding vector of a text query to one or more elements of a destination image embedding vector of a destination image embedding space. In response to receiving a text query, the computer system generates a text query embedding vector for the text query. The text query embedding vector is mapped to one or more elements of a destination image embedding vector of the destination image embedding space and the partial destination image embedding vector for the text query is projected into the destination image embedding space. Images of a corpus of images are also projected into the destination image embedding space according to corresponding destination image embedding vectors of the images, where each image is associated with a corresponding destination image embedding vector of the destination image embedding space. A subset of the projected images that have a greatest similarity to the received text query are selected, this selection made according to a similarity measure in the destination image embedding space between the projected partial destination image embedding vector for the text query and the projected destination image embedding vectors of the images. Finally, at least some images of the subset of the projected images are provided as a recommended response to the received text query.

For purposes of clarity and by way of definition, the term "exemplary," as used in this document, should be interpreted as serving as an illustration or example of something, and it should not be interpreted as an ideal or leading illustration of that thing. Stylistically, when a word or term is followed by "(s)", the meaning should be interpreted as indicating the singular or the plural form of the word or term, depending on whether there is one instance of the term/item or whether there is one or multiple instances of the term/item. For example, the term "user(s)" should be interpreted as one or more users. Moreover, the use of the combination "and/or" with multiple items should be viewed as meaning either or both items.

By way of definition, the term embedding vector refers to an array of values that reflect aspects and features of source data. For example, an embedding vector for an image will includes aspects and features of that image. Alternatively, an embedding vector corresponding to a user post on an online service, where the user post might typically include multiple, distinct items of content, is an array of aspects and/or features corresponding to the various items of content. By way of illustration and not limitation, an embedding vector may comprise 128 elements, each element represented by a 32- or 64-bit floating point value, each value representative of some aspect (or multiple aspects) of the input data. In other embodiments, the embedding vector may have additional or fewer elements and each element may have additional or fewer floating-point values.

By way of further definition, the term "content group," as used herein refers to a set of content items that are treated as a single collection or "group." By way of illustration, user posts to an online service are often treated as content groups, e.g., containing an image, a title, a user's caption and/or description, a hyperlink to the image, and the like. The online service receives and saves the user post as a single collection, i.e., a content group within a corpus of content groups. Each content group includes at least one content item.

As those skilled in the art will appreciate, embedding vectors are generated by embedding vector generators. Typically, an embedding vector generator accepts input data (e.g., an image or a multi-item user post), processes the input data through various levels of convolution, and produces an array of values that specifically reflect on the input data. Due to the nature of processing (i.e., the convolutions, which include transformations, aggregations, subtractions, extrapolations, normalizations, etc.) by a trained embedding vector, the contents or values of the elements of a given embedding vector are often meaningless to a personal examination. However, collectively the elements of an embedding vector can be used to project or map the input data into an embedding space as defined by the embedding vector generator.

As those skilled in the art will appreciate, two embedding vectors (generated from the same input type by the same embedding vector generator) may be compared for similarity as projected within the corresponding embedding space. For example, and by way of illustration, FIG. 1 is a pictorial diagram for illustrating embedding vectors of distinct types projected into embedding spaces, in accordance with aspects of the disclosed subject matter. Indeed, FIG. 1 illustrates two embedding spaces, embedding space 100 and embedding space 120. As can be seen, each embedding space is visually represented as a multi-dimensional space, indicative of the multi-dimensional nature of the space (based on the elements of the embedding vectors). As shown in FIG. 1, embedding vectors 102, 104 and 106 are embedding vectors of text input and are projected into the embedding space 100. In contrast and for this example, embedding vectors 122, 124 and 126 are embedding vectors of user posts comprising multiple content items and are projected into the embedding space 120 for user posts. As suggested by their projected proximity within the embedding space 100, embedding vectors 102 and 106 are similar/more alike, and embedding vectors 124 and 126 are more alike based on their projected proximity in the embedding space 120.

As those skilled in the art will appreciate, an embedding space is a multi-dimensional space, where each element of the embedding vector for that embedding space has a value that corresponds to one of the dimensions. Also, embedding vectors are both type specific and generator specific. They are "type specific" in that they require the same input type (or types) in order for the embedding vector generator to produce a meaningful embedding vector. The embedding vectors are "generator specific" in that the embedding vector generator (as a result of its training) is almost always the only source of knowledge of converting input data into the embedding vector. Indeed, while two embedding vector generators may be trained to generate embedding vectors from the same type of input data, unless the training of the embedding vectors was exactly the same (including exactly the same input data in the same sequence), it is very unlikely that the two embedding vector generators will generate the embedding vectors that identify the same aspects and features of the input data, with the same amplitudes of values, and order the elements of the embedding vectors in the same order, all of which is necessary to project embedding vectors into the same embedding space.

With reference to FIG. 1, embedding space 100 and embedding space 120 are shown as distinct, multi-dimensional embedding spaces, each being generated from different input data types (text vs. user posts). Thus, embedding vectors of embedding space 100 are not directly comparable to embedding vectors of embedding space 120. Advantageously, according to aspects of the disclosed subject matter, and as will be discussed in more detail below, a mapper module (typically a trained machine learning model) can be used to map an embedding vector of a first type (or types) into one or more elements of an embedding vector of a second type. The ability to map a first embedding vector into elements of a second embedding vector can lead to similarity comparisons within the second embedding vector space. This ability leads to providing recommended content in response to a query, when the query is not of the same type as the content maintained by an online service.

Figure 2A:
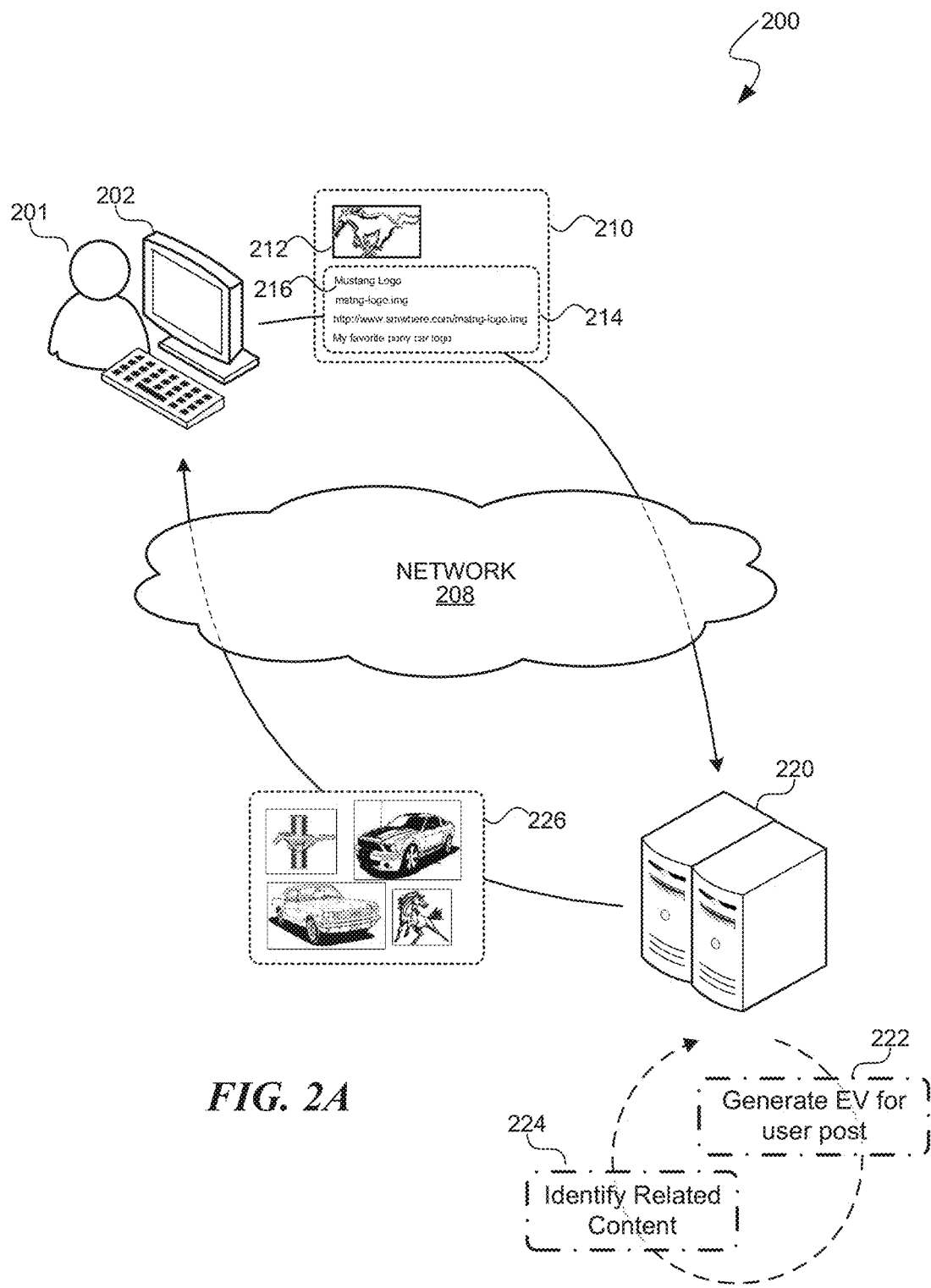
FIGS. 2A and 2B are block diagrams illustrating an exemplary network environment suitable for illustrating the provision of recommended content to a user of an online service in response to user interaction, and further suitable for identifying content recommendations from a multi-item embedding space based on a single-item query, in accordance with aspects of the disclosed subject matter.
Figure 2B:
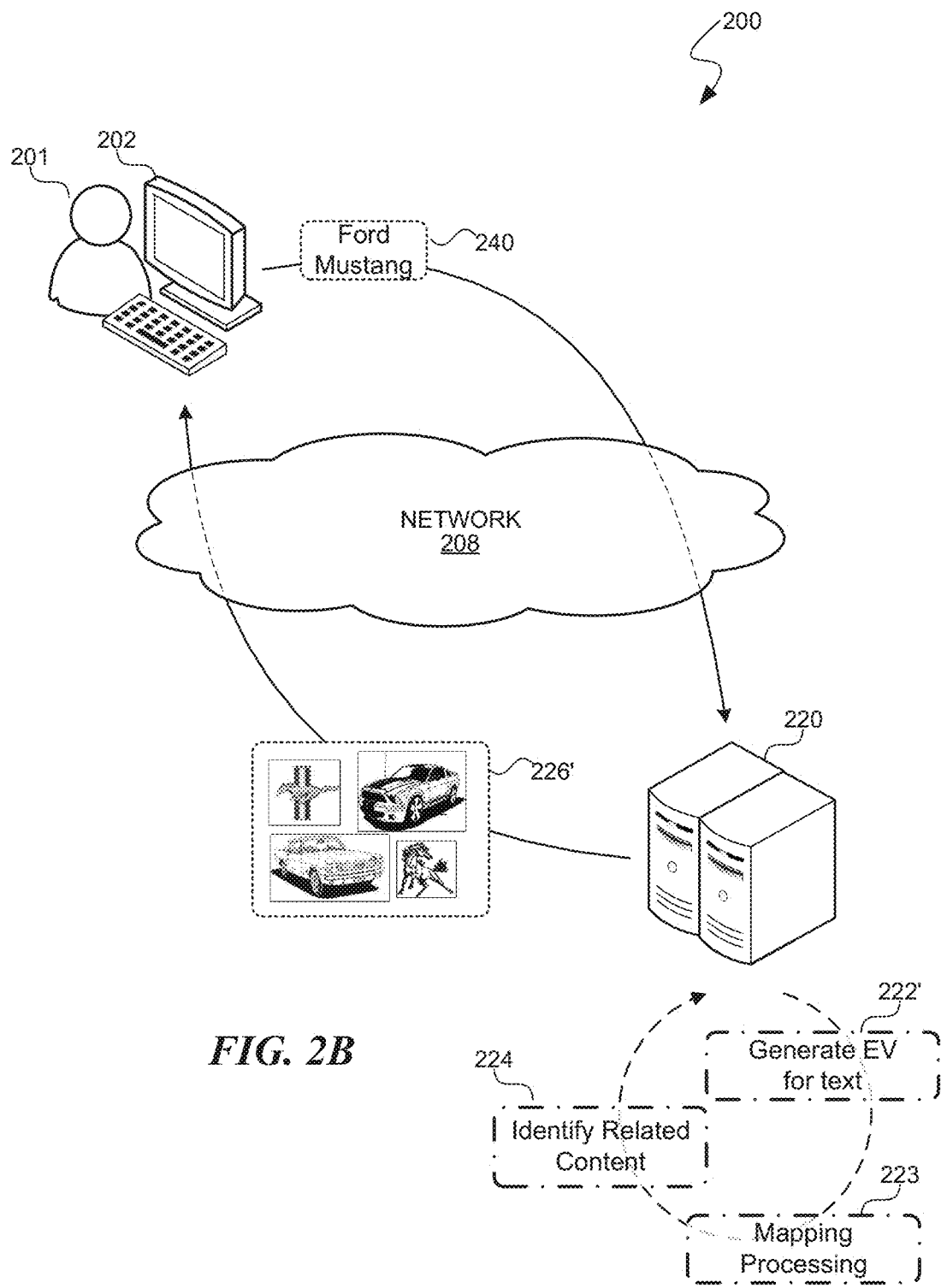

To further illustrate the mapping of a first embedding vector into a second, reference is now made to FIGS. 2A and 2B. As indicated above, FIGS. 2A and 2B are block diagrams illustrating an exemplary network environment 200 suitable for illustrating the provision of recommended content to a user of an online service in response to user interaction, and further suitable for identifying content recommendations from a multi-item embedding space based on a single-item query, in accordance with aspects of the disclosed subject matter. As shown in FIG. 2A, user 201 connects to the online service 220 via the user's computer device 202.

By way of illustration, in FIG. 2A a user 201 submits a user post 210 to an online service 220. In this example, the user post includes multiple items of content, i.e., an image 212 and a set 214 of text items including a user caption 216 "Mustang Logo." The user post 210 is submitted from the user's computer 202 by way of a network 208.

By way of definition, the network 208 is a computer network, synonymously referred to as a data network. As those skilled in the art will appreciate, the computer network 208 is fundamentally a telecommunications network over which computers, computing devices such as computing device 202, and other network-enabled devices and services can electronically communicate, including exchanging information and data. In computer networks, networked computing devices are viewed as nodes in the network. In FIGS. 2A and 2B, computing device 202 and online service 220 are both viewed as network nodes. In communicating with other devices over the network 208, connections between nodes are conducted using either cable media (physical, wired connections), wireless media (wireless connections) or both. While a well-known computer network is the Internet, the disclosed subject matter is not limited to the Internet. Indeed, elements of the disclosed subject matter may be suitably and satisfactorily implemented on wide area networks, local area networks, enterprise networks, and the like.

By way of additional definition, an online service, such as online service 220, is a network-accessible service that typically provides one or more interfaces that enable other users, devices, services, and/or processes to interact with the online service. Often, though not exclusively, these interfaces include one or more application programming interfaces (APIs) that allow programs and/or processes to interact with the online service, and/or one or more user interfaces by which the various users can interact with the online service. Social networking sites are non-limiting examples of online services, just as news organization sites and advertisement platforms are also non-limiting examples of online services.

Returning to FIG. 2A, for its part, the online service 220 receives the user post 210 from the computer user 201 and stores the user post as a content group in its corpus of content groups. According to aspects of the disclosed subject matter, the online service maintains each user post (a multi-item group of content that may include one or more item types) as a content group. Additionally, in many instances, an online service, such as online service 220, will generate an embedding vector for each content group and associate that embedding vector with the content group. Indeed, in this manner, a single embedding vector can be generated to represent the entirety of the individual items of content. Advantageously, this results in less storage and maintenance requirements while, at the same time, facilitating ready retrieval of similar content in response to a query or other user interaction.

In response to receiving the user post/content group and as part of providing similar and/or recommended content, the online service 220 generates 222 an embedding vector for the received user post, associates the embedding vector with the content group in a corpus of content groups, and uses the resulting embedding vector to identify 224 related and/or similar content for recommendation to the user. Subsequently, the online service 220 returns a set 226 of related/similar content, which may comprise content groups and/or elements (content items) of content groups, as recommended content to the user 201. As illustrated in FIG. 2A and by way of illustration only, the set 226 of recommended content includes a set of images that are related to the user post 210.

As those skilled in the art will appreciate, there are many times that a user 201 might submit a simple, single-item query to an online service 220 and expect high quality results, hopefully on par with other types of interactions. Indeed, in FIG. 2A, for illustration purposes, assume that the subject of the user post is about Ford Mustangs and the set 226 of related content includes images and logos for Ford Mustangs. Turning to FIG. 2B, in this scenario the user 201 submits a simple text query 240, "Ford Mustang." As the subject of the text query 240 is the same as that of the user post 210, one would expect that the set 226' of resulting content to this text query should be the same (as shown in FIG. 2B) or highly similar to the set 226 of recommended content returned in response to the user post 210 of FIG. 2A. However, and according to aspects of the disclosed subject matter, since the text query 240 does not include all content items of the user post 210, the online service 220 must, instead, generate 222' an embedding vector for the text query. Since the embedding vector of the text query belongs to a different embedding space, the online service 220 must perform an additional processing or mapping 223 to map the resulting text embedding vector into a form that can be compared in the embedding space corresponding to the embedding vectors of the content groups of the corpus. Once this mapping 223 is completed, the online service 220 can then identify 224 related/relevant/similar content items, and present this set 226' of content items to the user 201.

Figure 3A:
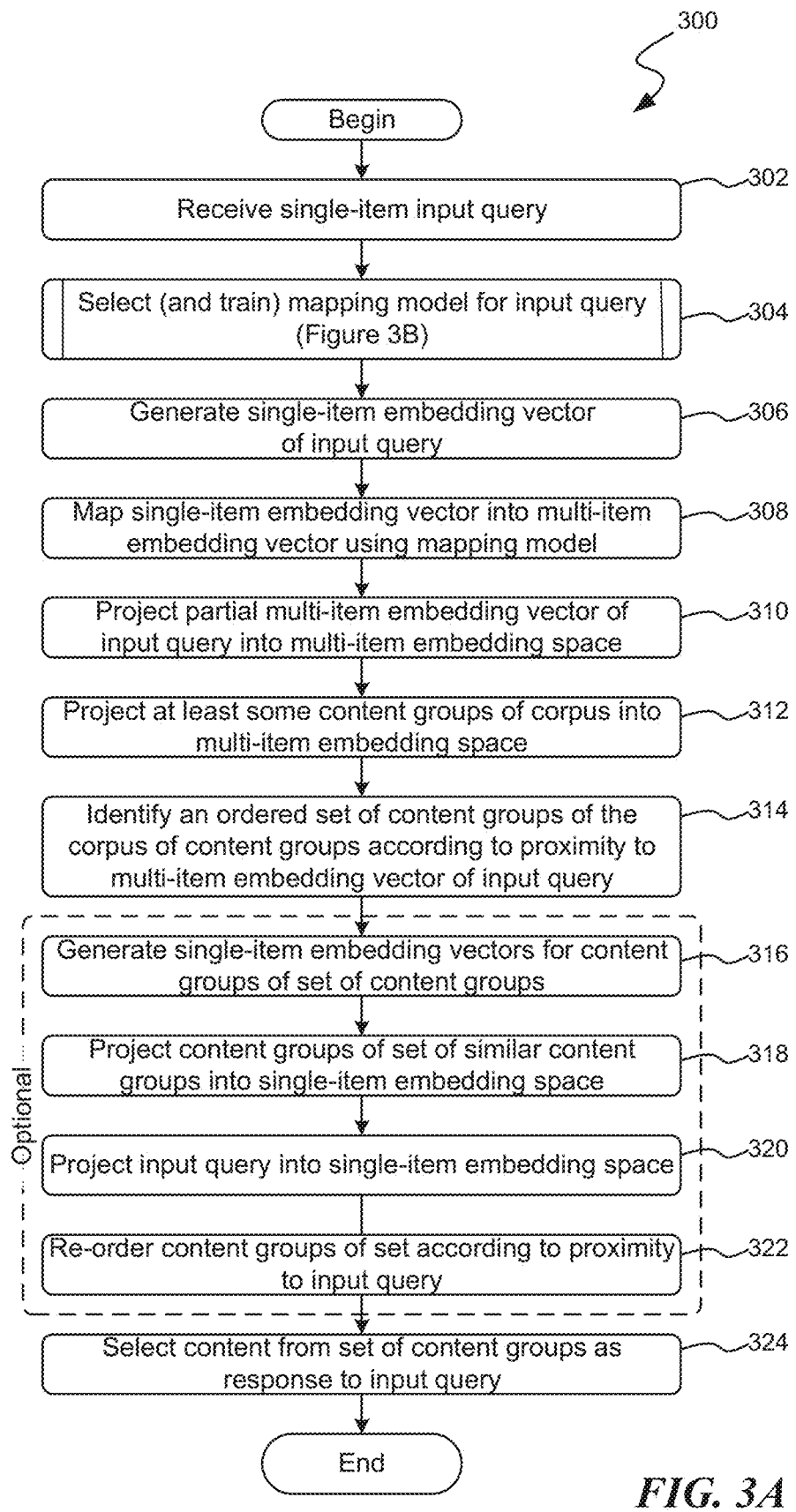
FIGS. 3A and 3B show a flow diagram illustrating an exemplary routine suitable for identifying content recommendations from a multi-item embedding space based on a single-item query, in accordance with aspects of the disclosed subject matter.
Figure 3B:
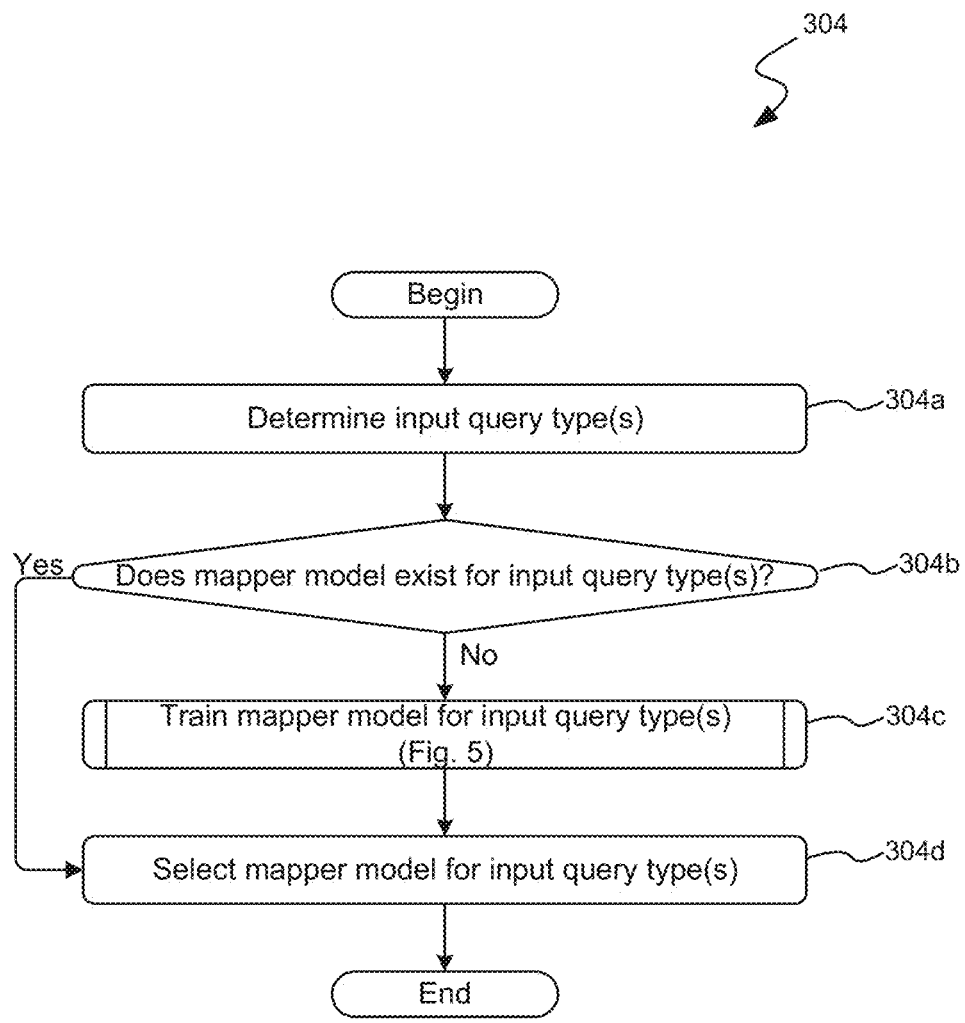

In regard to the additional processing and mapping 223 to map the text embedding vector into the multi-item embedding space, reference is now made to FIGS. 3A and 3B. FIGS. 3A and 3B illustrate an exemplary routine 300 suitable for identifying content recommendations from a multi-item embedding space based on a single-item query, in accordance with aspects of the disclosed subject matter.

Beginning at block 302, a single-item input query is received. In one, non-limiting embodiment, the single-item input query is a text-based query, much like text-query 240 of FIG. 2B.

At block 304, a mapper model is selected to map the input query (as described below) into an embedding space of content groups maintained in a corpus. For example, the content maintained in the corpus may comprise multi-item content groups such as user posts described above (e.g., images, captions, titles, file names, etc.) Selecting (a mapper model is described in more detail in FIG. 3B. Indeed, at block 304a of FIG. 3B, the input type or input types of the input query is (are) determined. As indicated above in the discussion of block 302, this input query may correspond to a single-item input query, i.e., a text-based query. Alternatively, the input query may correspond to a multi-item input query, a text item and an image item.

At decision block 304b and based on the input query type or types, a decision is made as to whether a mapper model for the input query already exists (i.e., has already been trained). As already indicated, the mapper model is trained to map the input query into the embedding space of the content groups of the corpus—the destination content type. In the example set forth above, this embedding space is a multi-item embedding space of content groups as maintained in the corpus of content groups.

If a mapper model has not previously been trained for the input type(s), the subroutine proceeds to block 304c. At block 304c, a mapper model is trained to map an embedding vector of the input query type(s) into a partial embedding vector of the destination content type(s) embedding space. Training the mapping model to perform this mapping is discussed below in connection with FIG. 5. After training the mapper model, or if the mapper model already existed, the routine proceeds to block 304d. At block 304d the mapper model corresponding the input query type(s) is selected for processing the received input query (from block 302).

At block 306 of FIG. 3A, an embedding vector generator is selected according to the input type (text, in this example) and generates a corresponding embedding vector, referred to as the single-item embedding vector. At block 308, the single-item embedding vector is mapped into one or more elements of a multi-item embedding vector of the multi-item embedding space corresponding to the type of embedding vectors associated with the content groups maintained by the online service.

As those skilled in the art will appreciate and according to aspects of the disclosed subject matter, the mapping of the single-item embedding vector into one or more elements of a multi-item embedding vector of the multi-item embedding space results in a partial multi-item embedding vector. Indeed, the partial multi-item embedding vector includes values that correspond to the type of the single-item input type (e.g., text) of the various content items of a content group. Other elements within the partial multi-item embedding vector that do not correspond to the type of the single-item input type are assigned a normative. Moreover, some elements that correspond to the input type may also be influenced by other item types. In various embodiments, this normative value may be zero. Alternatively, the normative value may be an averaged value of that element of all multi-item embedding vectors as contained in the corpus. Other values may also be used as a normative value. To further illustrate the mapping of a single-item embedding vector into one or more elements of a multi-item embedding vector, reference is now made to FIG. 4.

Figure 4:
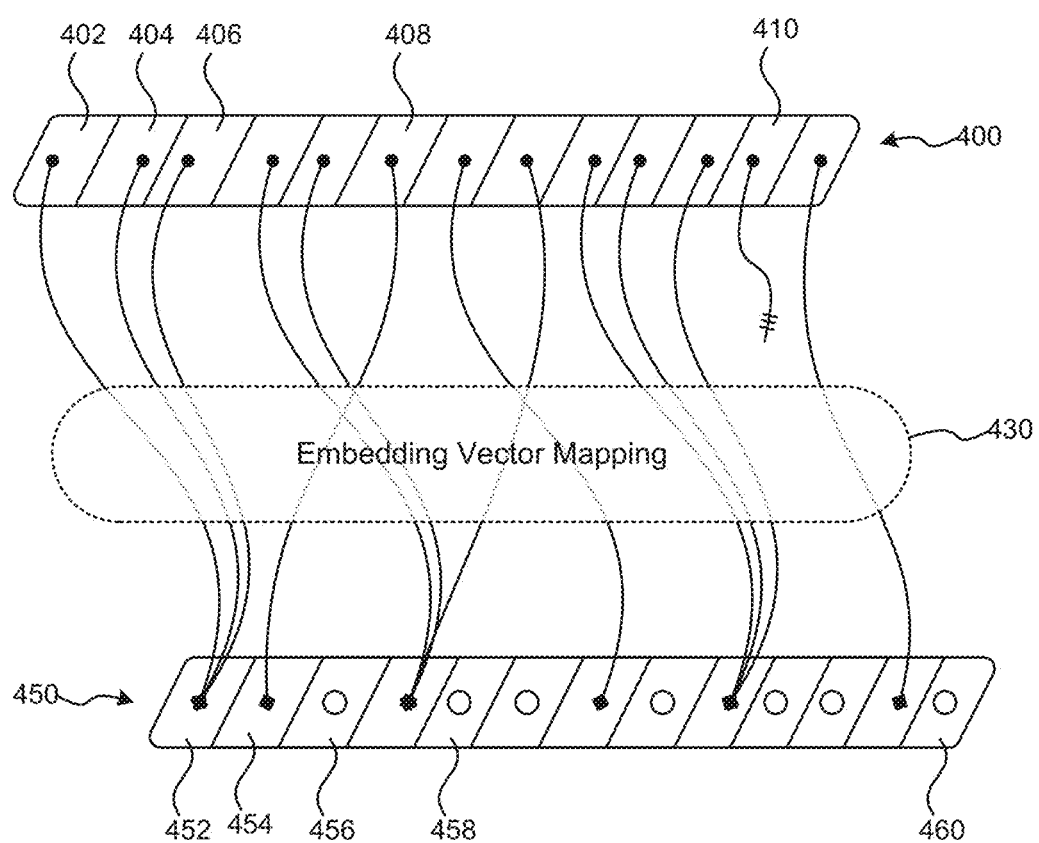
FIG. 4 is a block diagram illustrating an exemplary mapping of a single-item embedding vector into one or more elements of a multi-item embedding vector, in accordance with aspects of the disclosed subject matter.

FIG. 4 is a block diagram illustrating an exemplary mapping of a single-item embedding vector 400 into one or more elements of a multi-item embedding vector 450 in accordance with aspects of the disclosed subject matter. As illustratively shown, the single-item embedding vector 400 includes a set number of elements, including elements 402-410. Similarly, the multi-item embedding vector 450 also includes a set number of elements, including elements 452-460, though in various embodiments, this set number of elements of the multi-item embedding vector is not required to be the same number of elements as found in the single-item embedding vector 400.

As indicated previously, a mapping model is trained to map 430 the single-item embedding vector 400 into one or more items of a multi-item embedding vector 450, the result being referred to as a partial multi-item embedding vector as elements within the multi-item embedding vector 450 will correspond to other content items and/or item types.

As shown in FIG. 4, multiple single elements of the single-item embedding vector 400 may be mapped into a single element of the partial multi-item embedding vector 450, such as elements 402-406 being mapped into element 452. On the other hand, there may be a type of one to one correspondence, such as illustrated between element 408 of the single-item embedding vector 400 and element 454 of the partial multi-item embedding vector 450. Further still, some elements of the single-item embedding vector 400, such as element 410, may have no corresponding value in the partial multi-item embedding vector 450. As shown in FIG. 4, order and/or proximity of the elements of the single-item embedding vector 400 may or may not have any bearing on their corresponding representation within the partial multi-item embedding vector 450. Still further, in addition to mapping the elements of the single-item embedding vector into one or more elements of the partial multi-item embedding vector, the values that are mapped may be transformed or translated to it's (or their) representative value in the multi-item embedding space.

Returning to the discussion of routine 300 of FIG. 3A, after mapping the single-item embedding vector into one or more elements of the partial multi-item embedding vector, at block 310, the partial multi-item embedding vector is projected into the multi-item embedding space. At block 312, at least some content groups of the corpus of content groups are projected into the multi-item embedding space according to their associated/corresponding embedding vectors.

Regarding the projection of at least some content groups into the multi-item embedding space, those skilled in the art will appreciate that the projection of all content groups of a large corpus of content groups may be computationally infeasible in real time. Indeed, for at least one real-world online service, the online service maintains nearly a billion content groups in its corpus of content groups. Clearly, projecting a billion content groups into the multi-item embedding space (for purposes of identifying those that are most similar to the partial multi-item embedding vector) is computationally infeasible.

In order to address this computational barrier of identifying similar items within an embedding space, and according to aspects of the disclosed subject matter, a technique known as Locality Sensitive Hashing, or LSH can be employed. Generally speaking, and as the name suggests, LSH utilizes a computationally efficient hashing function (among other features) on the embedding vectors of a corpus of items to divide the corpus into a plurality of regions or "buckets," with each bucket containing some items of the corpus. A target item (e.g., the partial multi-item embedding vector) is also hashed and mapped to one or more buckets. With a properly functioning LSH hashing, the bucket (or buckets) into which the target embedding vector is hashed include the items that are most likely to be similar to the target item as determined by their projected proximity in the multi-item embedding space. Ideally, each bucket is balanced such that they each contain approximately the same number of items, which enhances efficiencies. Often, though not exclusively, this proximity/similarity measure is conducted as a cosine similarity function, measuring the angle between two embedding vectors projected into an embedding space. Efficient LSH hashing with good distribution (balanced buckets) is set forth in co-pending and commonly assigned U.S. patent application Ser. No. 16/417,479, filed May 20, 2019, entitled Efficient LSH Computation, and U.S. patent application Ser. No. 16/417,497, filed May 20, 2019, entitled Balanced Distribution of Items in LSH Mapping, each of which are incorporated herein by reference.

After projecting at least some content groups into the multi-item embedding space, at block 314 an ordered set of content groups are identified. This ordered set of content groups includes those content items that are most similar to the partial multi-item embedding vector, as determined by their similarity measures from the projected partial multi-item embedding vector. As indicated above, in various actual embodiments this similarity measure is carried out by way of a cosine similarity function/analysis. Typically, though not exclusively, the cosine similarity function is associated as a value or score indicative of the similarity/proximity to the partial multi-item embedding vector. The order of the identified set of content groups is based on this score, where those items closest to the partial multi-item embedding vector being considered the most similar.

While this set of content groups are considered those content groups that are likely the most-similar to the single-item input query, it should be recognized that the similarity measures may be slightly skewed since at least some of the elements of the partial multi-item embedding vector include assigned, normative values. Thus, a set of optional steps (316-322) may be conducted, if desired to validate and/or change the order of the set of content groups. At block 316, single-item embedding vectors may be generated for each of the content groups in the identified content group. These single-item embedding vectors are generated from the content item (or content items) that correspond to the input query.

With single-item embedding vectors for each of the content groups, at block 318 the content groups are projected into the single-item embedding space by way of their corresponding single-item embedding vectors. At block 320, the input query is projected into the single-item embedding space. At block 322, the set of content groups is reordered as a function of the similarity scores from the multi-item embedding space and the similarity scores from the single-item embedding space.

At block 324, at least some content groups are selected from the set of ordered (or the set of re-ordered) content groups, based, at least in part, on their order within the set. Additionally, in block 324, at least some content items of the selected content groups are presented to the requesting party as recommended content to the input query. Thereafter, routine 300 terminates.

While routine 300 is made in the context of receiving a single-item query, mapping that query into a multi-item space, and identifying related and/or similar content to the query based on a partial multi-item embedding vector, the fundamental elements of routine 300 may be suitably and advantageously applied to a variety of other scenarios. More particularly, aspects of the disclosed subject matter may be suitably and advantageously applied to responding to a query having one or more query items, mapping that query into a multi-item embedding space by way of a mapper model, and identifying related and/or similar content from a corpus of content mapped into the multi-item embedding space in response to the query.

By way of a more formulaic description, aspects of the disclosed subject matter include identifying an intersection of item types between an input query and content groups. In particular, according to aspects of the disclosed subject matter, given a function ItemList( ) to identify a non-null set of item types and a corpus of content groups comprising a plurality of content items, if the results of the intersection equation:

$$\text{ItemList(query)} \cap \text{ItemList(content group)}$$

is not a null set, then a mapping can be produced (i.e., a mapping model) to map the query into the multi-item embedding space associated with the content groups of a corpus. By way of illustration, if a query, query, comprises content items having item types {A, B, C}, and the content group items of a corpus comprise content items having item types {A, C, D, E}, the intersection of the two results in the non-null set {A, C}. According to aspects of the disclosed subject matter and as set forth above in regard to routine 300, a mapper model can be trained to map input queries having item types {A, B, C} as partial multi-item embedding vectors in the multi-item embedding space for content groups having content item types {A, C, D, E}. In further illustration of the above, it should be appreciated that aspects of the disclosed subject matter may be suitably applied in the case of a multi-item input query being mapped into a single item embedding vector. Indeed, if the input query has multiple item types {A, B, C}, a mapper model can be trained to map this input query as a partial (or even complete) single item embedding vector of content item type {A}.

Of course, each distinct set of input query item(s) to a partial embedding vector must have its own trained mapper model. Fortunately, each distinct mapper model can be trained and generated in an off-line, asynchronous, and even anticipatory manner. Additionally, while block 304 of routine 300 indicates the training of a mapper model, it is not necessary to generate a trained mapper model if one already exists for the input and output item types at hand.

In addition to producing mapping models for various input and output item types when the intersection of the types is non-null, in accordance with aspects of the disclosed subject matter a mapper module can be advantageously trained to map an input query of a first type (or types) to an embedding space of a second type (or types). For example, a mapper module could be trained to map an input query of type {A} to an embedding space of item types {B, C, D}. Further still a mapper module could be trained to map an input query of type {A} to map to an embedding space of item type {A'}, where A' indicates an item type of {A} but generated by an unavailable and/or inaccessible embedding vector generator. Similarly, and according to aspects of the disclosed subject matter, a mapper module could be trained to map an input query of type {A} into an embedding space of item type {B}.

Figure 5:
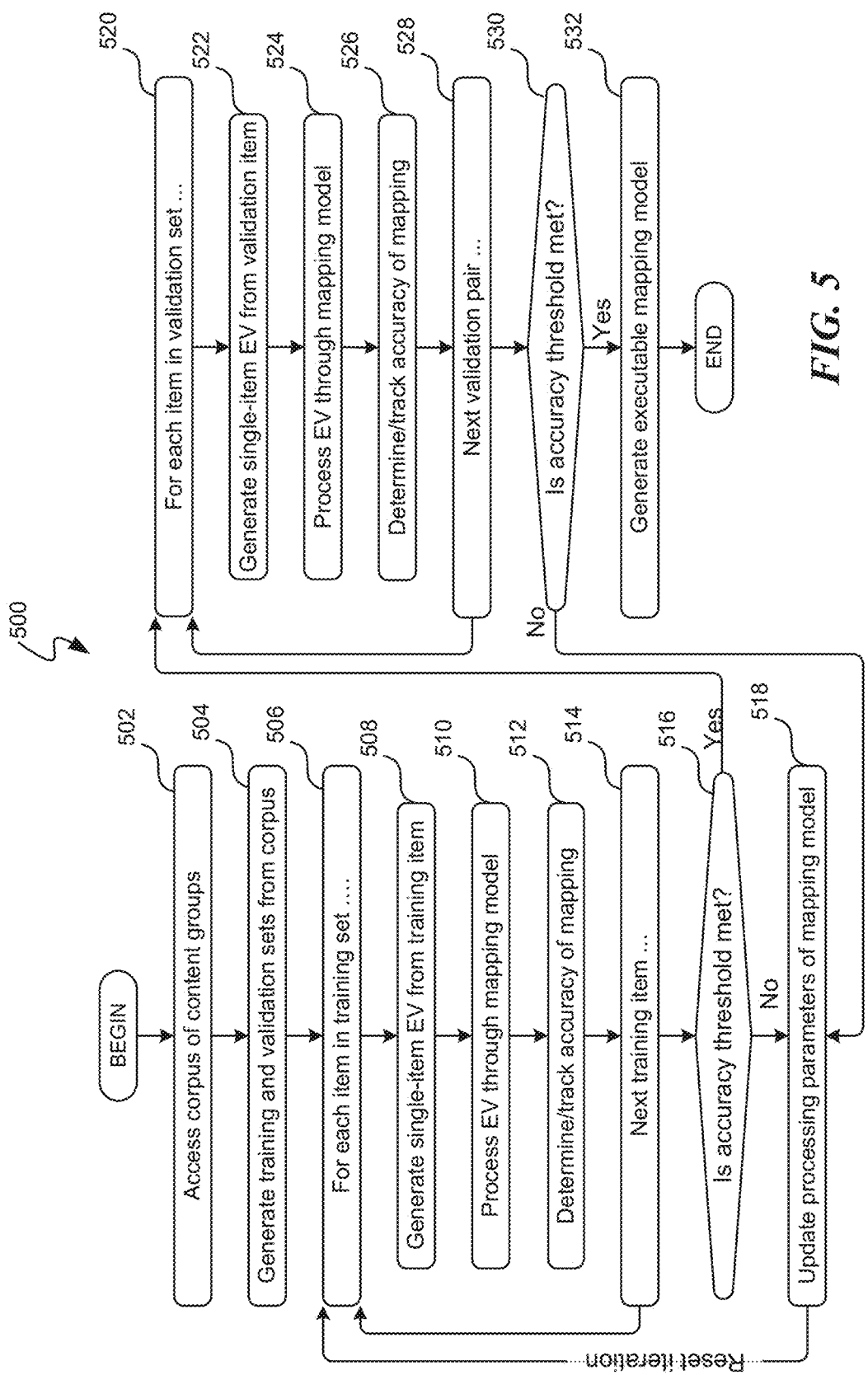
FIG. 5 is a flow diagram illustrating an exemplary routine suitable for training a machine learning model to map elements of an embedding vector of a single-item of content into elements of an embedding vector of a multi-item content group, in accordance with aspects of the disclosed subject matter.

In regard to training a mapper model, reference is now made to FIG. 5. Indeed, FIG. 5 is a flow diagram illustrating an exemplary routine 500 suitable for training a machine learning model (i.e., a mapper model) to map elements of an embedding vector of a single-item of content into elements of an embedding vector of a multi-item content group, in accordance with aspects of the disclosed subject matter. Beginning at block 502, a corpus of content groups is accessed. As indicated above, content groups are collections of a plurality of content items, where each content item has a type. Typically, though not exclusively, the plurality of content items includes a plurality of content types. By way of illustration and not limitation, the online service 220 described above maintains a corpus of content groups (derived from user posts), where each content group includes an image and several text-based items.

At block 504, training and validation sets are generated from content groups of the corpus of content groups. These sets comprise training pairs generated from content groups selected randomly from the corpus of content groups. The training pairs include positive training pairs, i.e., training pairs in which an input query matches one or more items in the corresponding content group, and negative training pairs, i.e., training pairs in which an input query does not match any item in the corresponding content group. As those skilled in the art will appreciate, the purpose of both training and validation sets is to carry out training iterations of a machine learning model (in this instance, a mapper model) by repeatedly training and then validating the training until the machine learning model achieves a predetermined threshold of accuracy. Typically, though not exclusively, the training and validation sets include about the same number of elements (i.e., content groups). Additionally, a sufficient number of elements must be contained within each group to ensure proper training and validation, since using too few may result in a high level of accuracy among the training and validation sets, but a low level of accuracy among the entire corpus.

With the training and validation sets established, at block 506, an iteration loop is begun to iterate through the items/content groups of the training set. At block 508, an embedding vector is generated from an element (or elements) of the current item/content group that corresponds to a targeted input type (or input types). For example and by way of illustration and not limitation, if the target of the mapper model is to map a text query into the multi-item embedding space to identify related content, a text embedding vector is generated from a corresponding element (or elements) of the currently iterated content group that are textual. If, for example, the current content group corresponded to the user post 210 of FIG. 2A, an embedding vector may be generated from the user-supplied caption 216, or from all of the text-based content 214.

At block 510, the embedding vector generated from elements of the currently iterated content group are processed through the various elements of the mapping model to conduct a mapping of the input embedding vector into one or more elements of a partial multi-item embedding vector. At block 512, the results of the processing by the mapping model are checked. More particularly, according to various embodiments of the disclosed subject matter, an evaluation can be made between the partial multi-item embedding vector and the multi-item embedding vector associated with the currently iterated content group to determine whether the mapping is accurate. The accuracy of the mapping is tracked and aggregated with the results of other iterations for updating and refining the mapping model in its training.

After determining and tracking the accuracy of the training model on the currently iterated content group, at block 514 if there are additional content groups in the training set to be processed the routine 500 returns to block 506 to select and process the next content group of the training set as set forth above. Alternatively, if there are no additional content groups to be processed, the routine 500 proceeds to decision block 516.

At decision block 516, a determination is made as to whether a predetermined accuracy threshold is met by the mapping model in processing the training set. This determination is made according to the tracking information aggregated in processing the training data. If the mapping model has not at least achieved this predetermined accuracy threshold, the routine 500 proceeds to block 518. At block 518, the processing parameters of the mapping model, including but not limited to the convolutions, aggregations, formulations, and/or hyperparameters are updated, and the routine 500 returns to block 506, resetting the iteration process on the training data in order to iteratively continue the training of the mapping model.

At decision block 516, if the predetermined accuracy threshold has been met by the mapping model, the routine 500 proceeds to block 520. At block 520, an iteration loop is begun to process the elements (content groups) of the validation set, much like the processing of the training set. Indeed, at block 522, an embedding vector is generated from an element (or elements) of the currently iterated content group that corresponds to a targeted input type (or input types). At block 524, the embedding vector generated from elements of the currently iterated content group are processed through the various levels of the mapping model to conduct a mapping of the input embedding vector into one or more elements of a partial multi-item embedding vector. At block 526, an evaluation is made between the partial multi-item embedding vector and the multi-item embedding vector associated with the currently iterated content group to determine whether the mapping is accurate. The accuracy of the mapping is tracked and aggregated with the results of other iterations of the validation set for updating and refining the mapping model in its training.

At block 528, if there are additional content groups in the validation set to be processed, the routine 500 returns to block 520 to select and process the next content group of the validation set, as set forth above. Alternatively, if there are not additional content groups to be processed, the routine 500 proceeds to decision block 530.

At decision block 530, a determination is made as to whether a predetermined accuracy threshold, which may or may not be the same predetermined accuracy threshold as used in block 516, is met by the mapping model in processing the validation set. This determination is made according to the tracking information aggregated in processing the validation data. If the mapping model has not at least achieved this predetermined accuracy threshold, the routine 500 proceeds to block 518. As set forth above, at block 518, the processing parameters of the mapping model, including but not limited to the convolutions, aggregations, formulations, and/or hyperparameters are updated, and the routine 500 returns to block 506, resetting the iteration process on the training data in order to restart the iterations with the training set.

In the alternative, if at decision block 530, if the accuracy threshold has been met (or exceeded), it is considered that the mapping model has been accurately trained and the routine 500 proceeds to block 532. At block 532, an executable mapping model is generated. As those skilled in the art will appreciate, a training version of the mapping model will include elements that allow its various levels, processing variables and/or hyperparameters to be updated. In contrast, an executable mapping model is generated such that features that allow the mapping model are removed without modifying the mapping abilities of the trained mapper model. Thereafter, the routine 500 terminates.

Figure 6:
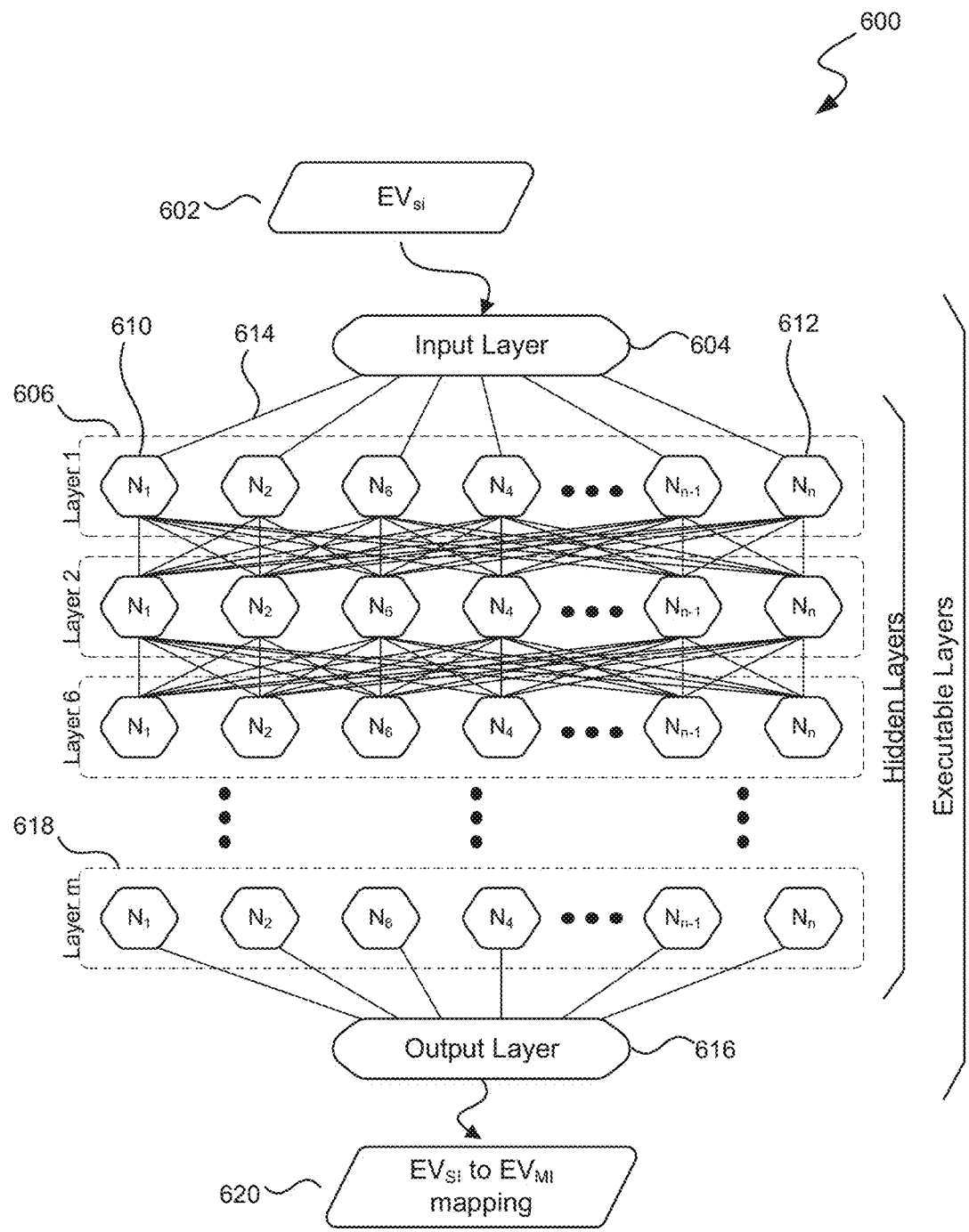
FIG. 6 is a block diagram illustrating exemplary components of a machine learning model which can be suitably trained to map elements of a first embedding vector of a first embedding space into elements of a second embedding vector of a second embedding space, in accordance with aspects of the disclosed subject matter.

FIG. 6 is a block diagram illustrating exemplary components of a machine learning model 600 which can be suitably trained as a mapper model to map elements of a first embedding vector of a first embedding space into elements of a second embedding vector of a second embedding space, in accordance with aspects of the disclosed subject matter.

As those skilled in the art will appreciate, a machine learning model 600 comprises multiple executable layers, including an input layer 604, an output layer 616, and one or more hidden layers. By way of illustration, the exemplary machine learning model 600 includes m hidden layers, including hidden layers 606 and 618. The input layer 604 accepts the input data, e.g., an embedding vector of a single-item of content 602, for which the machine learning model 600 is to generate a mapping into one or more elements of a partial multi-item embedding vector.

The input layer 604 accepts the input data, in this illustrated instance the embedding vector of an single-item of content 602, and, according to one or more predetermined algorithms and/or heuristics embedded within the various layers, maps the input embedding vector into the partial multi-item embedding vector through a series of process layers, each layer outputting values. These values, not shown in FIG. 6 but implied by the various edges, such as edge 614, extending from the input layer 604 to the various processing nodes of the first hidden layer 606, constitute at least some of the output of the input layer and are distributed as input data or input values to processing nodes of the first hidden layer 606 of the machine learning model 600, such as processing nodes 610 and 612.

Typically, though not exclusively, a value or facet of the input data passed from the input layer 604 to a first processing node in the first hidden layer, such as node 610 of hidden layer 606, is different than a value/facet passed to a second processing node of that same hidden layer, such as to node 612 of hidden layer 606.

Each hidden layer, including hidden layers 606 and 618, comprises a plurality of processing or convolutional nodes. By way of illustration and not limitation, hidden layer 606 includes n processing nodes, $N_1$-$N_n$. While the processing nodes of the first hidden layer 606 typically, though not exclusively, have a single input value from the input layer 604, processing nodes of subsequent hidden layers typically have input values from one or more processing nodes of the previous input layer. Of course, in various embodiments the processing nodes of the first hidden layer 606 may receive, as input values, all output values of the input layer 604.

In various embodiments and as illustrated in the executable neural network 600, each hidden layer (except for the first hidden layer 606) accepts input data/signals from each processing node of the prior hidden layer, as indicated by the edges proceeding from a processing node of an "upper" hidden layer (e.g., layer 606) to a "lower" hidden layer. Of course, alternative embodiments need not include such wide distribution of output values to the processing nodes of a subsequent, lower level.

Each processing node implements one or more "convolutions," "computations" or "transformations" on the input data it receives (whether the processing node receives a single-item of input data, or plural items of input data) to produce a single output value. These convolutions, projections, and/or transformations may include any number of functions or operations to generate the output data such as, by way of illustration and not limitation, data aggregations, clustering various input values, transformations of input values, combination of plural input values, selections and/or filters among input values, mathematical manipulations of one or more input values, linear and/or multivariate regressions of the input values, statistical determinations of the input values, predictive evaluations, and the like. Moreover, individual items of input data may be weighted in any given processing node such that the weighted input data plays a greater or lesser role in the overall computation for that processing node. Items of input data may be weighted in such a manner as to be ignored in the various convolutions and computations. Hyperparameters (data/values that are input from sources external to processing nodes of a prior input level) may also be utilized by all or some of the processing nodes of a hidden layer.

As will be appreciated by those skilled in the art, one of the interesting aspects of training machine learning models is that the various executable levels are adaptable to accommodate self-learning. In other words, when provided feedback, modifications may be made to the weights, parameters, and processing or convolutional operations of the processing nodes in the various layers, in order to achieve better results. Due to this adaptability, except for initially established computations of the various processing nodes in a training phase of the machine learning process, a person is unlikely to have specific insight or knowledge as to the exact nature of output values and, correspondingly, the exact nature of convolutions and/or computations that any particular processing node of a hidden layer may utilize. Instead, during the training process of a machine learning model, the machine learning model adaptively makes its own determinations as to how to modify each computation, convolution or transformation of a given processing node to produce better and/or superior results from the input values it receives.

At the final hidden layer, e.g., layer 618, the processing nodes provide their output data to the output layer 616. The output layer 616 performs whatever final aggregations, calculations, transformations, projections, normalizations and/or interpretations of the various items of input data to produce a partial multi-item embedding vector based on the input embedding vector.

Regarding routines 300 and 500 described above, as well as other routines and/or processes described or suggested herein, while these routines/processes are expressed in regard to discrete steps, these steps should be viewed as being logical in nature and may or may not correspond to any specific, actual and/or discrete execution steps of a given implementation. Also, the order in which these steps are presented in the various routines and processes, unless otherwise indicated, should not be construed as the only or best order in which the steps may be carried out. Moreover, in some instances, some of these steps may be combined and/or omitted.

Optimizations of routines may be carried out by those skilled in the art without modification of the logical process of these routines and processes. Those skilled in the art will recognize that the logical presentation of steps is sufficiently instructive to carry out aspects of the claimed subject matter irrespective of any specific development or coding language in which the logical instructions/steps are encoded. Additionally, while some of these routines and processes may be expressed in the context of recursive routines, those skilled in the art will appreciate that such recursive routines may be readily implemented as non-recursive calls without actual modification of the functionality or result of the logical processing. Accordingly, the particular use of programming and/or implementation techniques and tools to implement a specific functionality should not be construed as limiting upon the disclosed subject matter.

Of course, while these routines and/or processes include various novel features of the disclosed subject matter, other steps (not listed) may also be included and carried out in the execution of the subject matter set forth in these routines, some of which have been suggested above. Those skilled in the art will appreciate that the logical steps of these routines may be combined or be comprised of multiple steps. Steps of the above-described routines may be carried out in parallel or in series. Often, but not exclusively, the functionality of the various routines is embodied in software (e.g., applications, system services, libraries, and the like) that is executed on one or more processors of computing devices, such as the computing system described in FIG. 8 below. Additionally, in various embodiments all or some of the various routines may also be embodied in executable hardware modules including, but not limited to, systems on chips (SoC's), codecs, specially designed processors and/or logic circuits, and the like.

As suggested above, these routines and/or processes are typically embodied within executable code blocks and/or modules comprising routines, functions, looping structures, selectors and switches such as if-then and if-then-else statements, assignments, arithmetic computations, and the like that, in execution, configure a computing device to operate in accordance with the routines/processes. However, the exact implementation in executable statement of each of the routines is based on various implementation configurations and decisions, including programming languages, compilers, target processors, operating environments, and the linking or binding operation. Those skilled in the art will readily appreciate that the logical steps identified in these routines may be implemented in any number of ways and, thus, the logical descriptions set forth above are sufficiently enabling to achieve similar results.

While many novel aspects of the disclosed subject matter are expressed in executable instructions embodied within applications (also referred to as computer programs), apps (small, generally single or narrow purposed applications), and/or methods, these aspects may also be embodied as computer executable instructions stored by computer readable media, also referred to as computer readable storage media, which (for purposes of this disclosure) are articles of manufacture. As those skilled in the art will recognize, computer readable media can host, store and/or reproduce computer executable instructions and data for later retrieval and/or execution. When the computer executable instructions that are hosted or stored on the computer readable storage devices are executed by a processor of a computing device, the execution thereof causes, configures and/or adapts the executing computing device to carry out various steps, methods and/or functionality, including those steps, methods, and routines described above in regard to the various illustrated routines and/or processes. Examples of computer readable media include but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random-access memory (RAM), read-only memory (ROM), memory cards, thumb drives, and the like; cloud storage (i.e., an online storage service); and the like. While computer readable media may reproduce and/or cause to deliver the computer executable instructions and data to a computing device for execution by one or more processors via various transmission means and mediums, including carrier waves and/or propagated signals, for purposes of this disclosure computer readable media expressly excludes carrier waves and/or propagated signals.

Figure 7:
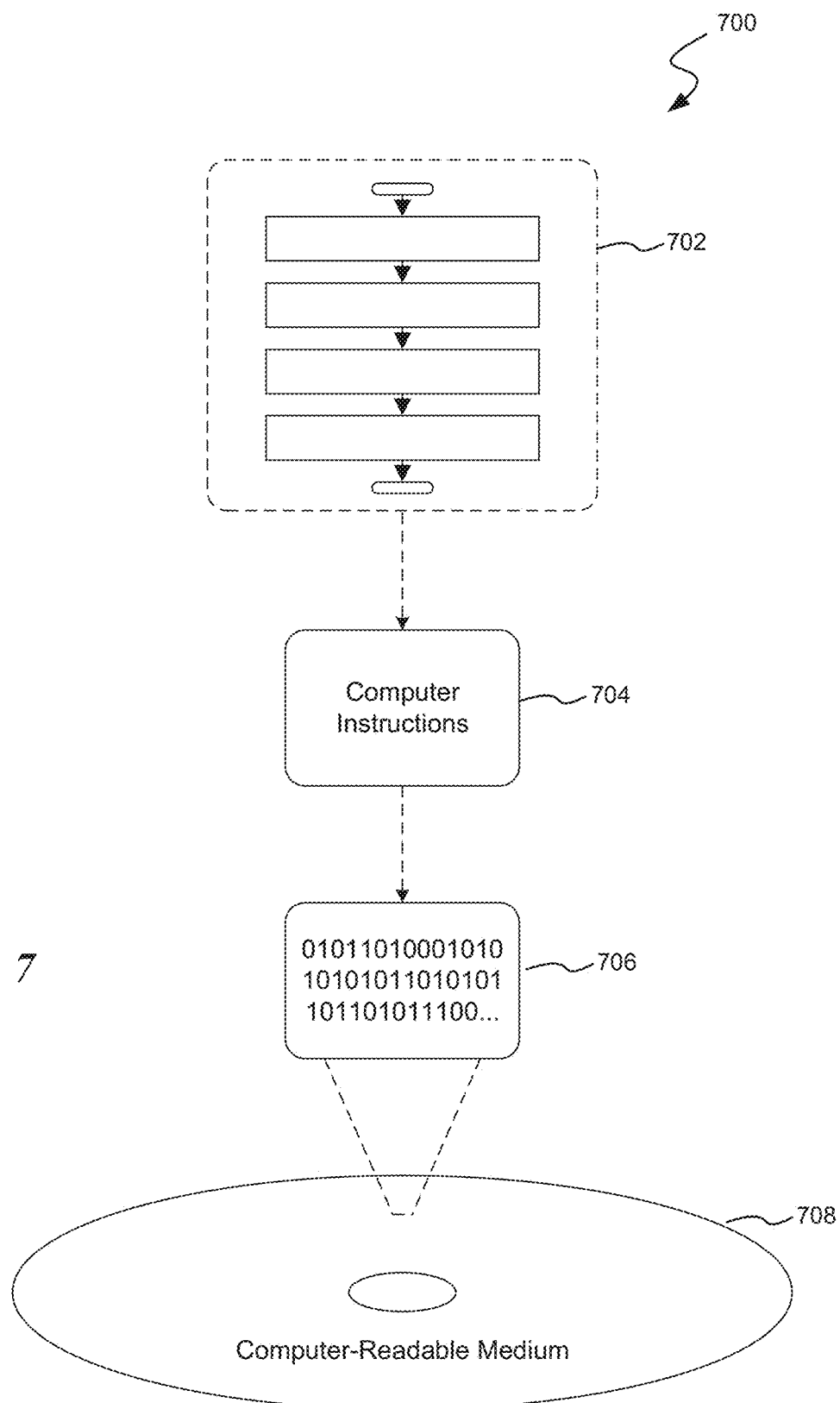
FIG. 7 is a block diagram illustrating an exemplary computer readable medium encoded with instructions for mapping an input item into one or more elements of a multi-item embedding vector, formed in accordance with aspects of the disclosed subject matter.

Regarding computer readable media, FIG. 7 is a block diagram illustrating an exemplary computer-readable medium bearing instructions for mapping an embedding vector of an input item into one or more elements of a multi-item embedding vector from which content recommendations may be identified and made, formed in accordance with aspects of the disclosed subject matter. More particularly, the implementation 700 comprises a computer-readable medium 708 (e.g., a CD-R, DVD-R or a platter of a hard disk drive), on which is encoded computer-readable data 706. This computer-readable data 706 in turn comprises a set of computer instructions 704 configured to operate according to one or more of the principles set forth herein. In one such embodiment 702, the processor-executable instructions 704 may be configured to perform a method, such as at least some of exemplary routines 300 and 500, for example. In another such embodiment, the processor-executable instructions 704 may be configured to implement a system on a computing device, such as at least some of the exemplary, executable components of computing device 800 of FIG. 8, as described below. Many such computer readable media may be devised, by those of ordinary skill in the art, which are configured to operate in accordance with the techniques presented herein.

Figure 8:
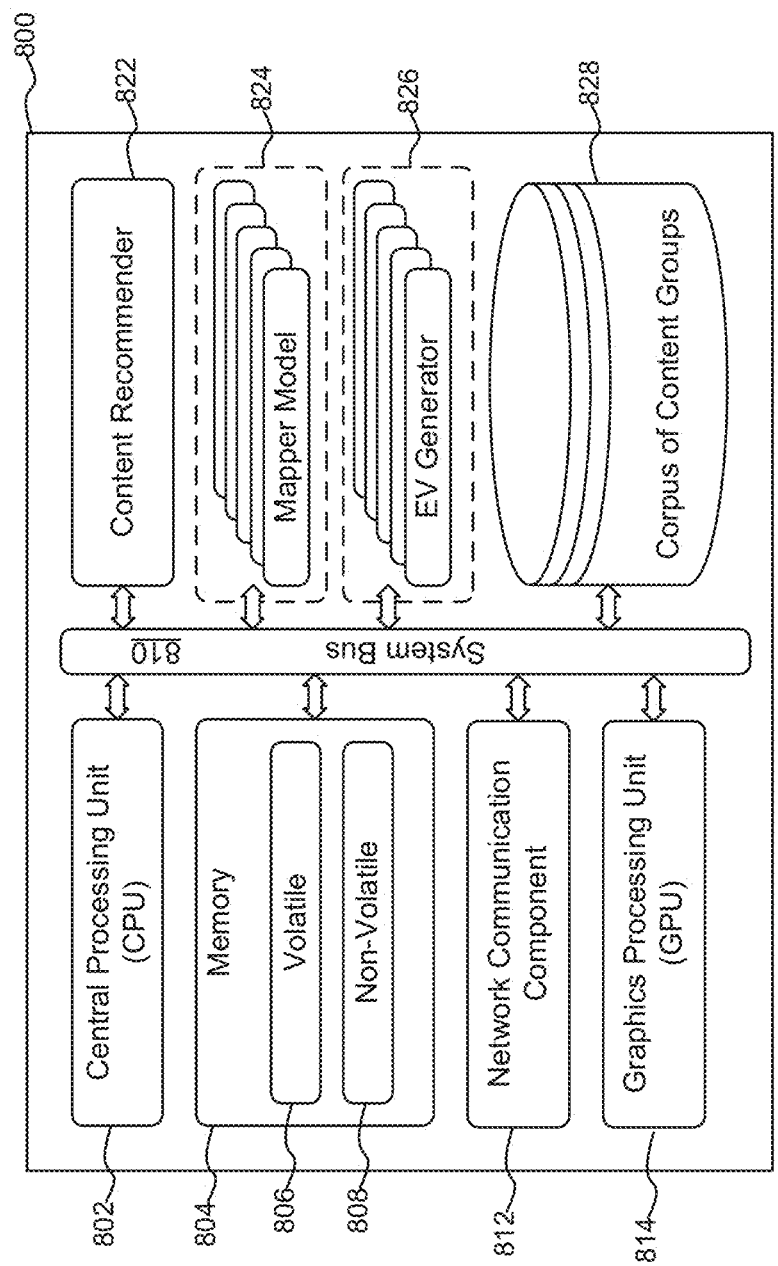
FIG. 8 is a block diagram illustrating exemplary components of a computing system suitable for mapping an input item into one or more elements of a multi-item embedding vector from which content recommendations can be made, in accordance with aspects of the disclosed subject matter.

Turning to FIG. 8, FIG. 8 is a block diagram illustrating exemplary components of a computing system suitable for mapping an input item into one or more elements of a multi-item embedding vector from which content recommendations can be made, formed in accordance with aspects of the disclosed subject matter. The computing system 800 typically includes one or more central processing units (or CPUs), such as CPU 802, and further includes at least one memory 804. The CPU 802 and memory 804, as well as other components of the computing system, are interconnected by way of a system bus 810.

As will be appreciated by those skilled in the art, the memory 804 typically (but not always) comprises both volatile memory 806 and non-volatile memory 808. Volatile memory 806 retains or stores information so long as the memory is supplied with power. In contrast, non-volatile memory 808 can store (or persist) information even when a power supply is not available. In general, RAM and CPU cache memory are examples of volatile memory 806 whereas ROM, solid-state memory devices, memory storage devices, and/or memory cards are examples of non-volatile memory 808.

As will be further appreciated by those skilled in the art, the CPU 802 executes instructions retrieved from the memory 804, from computer readable media, such as computer readable media 708 of FIG. 7, and/or other executable components in carrying out the various functions of the disclosed subject matter. The CPU 802 may be comprised of any of a number of available processors such as single-processor, multi-processor, single-core units, and multi-core units, which are well known in the art.

Further still, the illustrated computing system 800 typically also includes a network communication interface 812 for interconnecting this computing system with other devices, computers and/or services over a computer network, such as network 208 of FIGS. 2A and 2B. The network communication interface 812, sometimes referred to as a network interface card or NIC, communicates over a network using one or more communication protocols via a physical/tangible (e.g., wired, optical fiber, etc.) connection, a wireless connection such as WiFi or Bluetooth communication protocols, NFC, or a combination thereof. As will be readily appreciated by those skilled in the art, a network communication interface, such as network communication component 812, is typically comprised of hardware and/or firmware components (and may also include or comprise executable software components) that transmit and receive digital and/or analog signals over a transmission medium (i.e., the network 208).

The illustrated computing system 800 also includes a graphics processing unit (GPU) 814. As those skilled in the art will appreciate, a GPU is a specialized processing circuit designed to rapidly manipulate and alter memory. Initially designed to accelerate the creation of images in a frame buffer for output to a display, due to their ability to manipulate and process large quantities of memory, GPUs are advantageously applied to training machine learning models and/or neural networks that manipulate large amounts of data. Indeed, one or more GPUs, such as GPU 814, are often viewed as essential processing components when conducting machine learning techniques. Also, and according to various embodiments, while GPUs are often included in computing systems and available for processing convolutions of machine learning models, such as GPU 814 of computing system 800, multiple GPUs are also often deployed as online GPU services or farms and machine learning processing are advantageously directed to conducting the various layers/convolutions of training a neural network.

Also included in the illustrated computing system 800 is a content recommender 822. As described above in regard to routine 300 of FIG. 3A, a content recommender 822 is an executable component of the computing system that, in execution, is configured to receive an input, e.g., a query, user post, and/or other user information, map the input into a multi-item embedding space of content groups in a corpus of content groups 828, which results in a partial multi-item embedding vector for the input, identify related content within the corpus of content groups according to the partial multi-item embedding vector, and return at least some content to the input as recommended content. In determining the content recommendation, the content recommender 822 determines the type of intersection between the input and the item types of the content group, selects an embedding vector generator corresponding to that intersection type and generates an embedding vector generator, from a plurality of embedding vector generators 826, from the input, and generates an input embedding vector. Additionally in carrying the content recommendation, the content recommender 822 trains (if not already trained) and selects a mapper model 824, of one or more mapper models 824, that is specifically trained to map an embedding vector based on the type of intersection between the input and the item types of the content group, as generated by the selected embedding vector generator, and maps the input embedding vector into one or more elements of a multi-item embedding vector of the multi-item embedding space corresponding to the content groups of the corpus of content groups 828, resulting in a partial multi-item embedding vector. Ultimately, in carrying the content recommendation to the input action, the content recommender 822 utilizes the mapped partial multi-item embedding vector to identify related and/or similar content from the content groups of the corpus of content groups 828 and provides that identified content in response to the input action.

At least one additional, optional component that may be included is a re-ordering component to re-order the set of content groups identified as being similar and/or related to the input, as described in regard to blocks 316-322 of routine 300 illustrated in FIG. 3A.

Regarding the various components of the exemplary computing device 800, those skilled in the art will appreciate that many of these components may be implemented as executable software modules stored in the memory of the computing device, as hardware modules and/or components (including SoCs—system on a chip), or a combination of the two. Indeed, components may be implemented according to various executable embodiments including, but not limited to, executable software modules that carry out one or more logical elements of the processes described in this document, or as hardware and/or firmware components that include executable logic to carry out the one or more logical elements of the processes described in this document. Examples of these executable hardware components include, by way of illustration and not limitation, ROM (read-only memory) devices, programmable logic array (PLA) devices, PROM (programmable read-only memory) devices, EPROM (erasable PROM) devices, and the like, each of which may be encoded with instructions and/or logic which, in execution, carry out the functions described herein.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A computer-implemented method for providing content item recommendations in response to a query, the method comprising:

training a mapping model to map elements of an embedding vector of a query item of a received query to one or more elements of a multi-item embedding vector;

maintaining a corpus of content groups, each content group comprising a plurality of individual content items having content items of at least two different content types, and each content group being associated with a corresponding multi-item embedding vector of a multiitem embedding space, wherein each corresponding multi-item embedding vector is generated according to the plurality of individual content items of a corresponding content group and is representative of an entirety of the plurality of individual content items having content items of at least two different content types that form the corresponding content group;

sectioning the corpus of content groups into sections according to a Locality Sensitive Hashing (LSH) function;

receiving a query, the query comprising at least a first content item, wherein the query comprises fewer content items than the plurality of individual content items of a content group;

generating a query embedding vector for the at least first content item of the query;

mapping elements of the query embedding vector to one or more elements of a mapped multi-item embedding vector of the multi-item embedding space according to an identified mapping of the trained mapping model, the mapping resulting in a partial multi-item embedding vector for the query;

projecting the partial multi-item embedding vector for the query into the multi-item embedding space;

determining a most-likely section of similar content groups for the partial multi-item embedding vector for the query;

projecting content groups of the most-likely section of similar content groups into the multi-item embedding space according to the corresponding multi-item embedding vectors of the content groups of the most-likely section of similar content groups;

selecting a subset of the projected content groups that have a greatest similarity to the received query, wherein the content groups of the subset of content groups are selected according to a similarity measure in the multi-item embedding space between the projected partial multi-item embedding vector for the query and the projected multi-item embedding vectors of the corresponding projected content groups within the multi-item embedding space; and providing at least some content groups of the subset of the projected content groups as a response to the received query.

2. The computer-implemented method of claim 1, wherein the at least two different content types include any two or more of audio content types, video content types, image content types, textual content, uniform resource locator (URL) source information, and a filename.

3. The computer-implemented method of claim 1, wherein the received query comprises at least two content items.

4. The computer-implemented method of claim 1, wherein the similarity measure determines a distance between the projected partial multi-item embedding vector for the query and the projected multi-item embedding vectors of the corresponding projected content groups within the multi-item embedding space according to a cosine similarity measure.

5. The computer-implemented method of claim 1, wherein mapping the query embedding vector to one or more elements of the mapped multi-item embedding vector of the multi-item embedding space according to the identified mapping of the trained mapping model results in mapping the elements of the query embedding vector into a fewer number of elements of the partial multi-item embedding vector.

6. A computer-readable medium bearing computer-executable instructions which, when executed on a computing system comprising at least a processor executing the instructions, carry out a method for providing content item recommendations in response to a query, the method comprising:

maintaining a corpus of content groups, each content group comprising a plurality of individual content items having content items of at least two different content types, wherein each content group is associated with a corresponding destination content group embedding vector of a destination content group embedding space that is representative of an entirety of the plurality of individual content items having content items of at least two different content types that form the content group;

sectioning the corpus of content groups into sections according to a Locality Sensitive Hashing (LSH) function;

receiving a query for one or more content groups from the corpus of content groups, the query comprising at least a first content item of a first content type;

selecting a mapping model trained to map an input query embedding vector to one or more elements of a destination content group embedding vector of the destination content group embedding space;

generating an input query embedding vector for the at least first content item of the query, wherein the input query embedding vector is of an embedding space for the at least first content type;

mapping the input query embedding vector to one or more elements of a destination content group embedding vector according to an identified mapping of the trained mapping model, the mapping resulting in a partial destination content group embedding vector for the query;

projecting the partial destination content group embedding vector for the query into the destination content group embedding space;

determining a most-likely section of similar content groups for the partial multi-item embedding vector for the query;

projecting content groups of the most-likely section of similar content groups into the destination content group embedding space according to the corresponding destination content group embedding vectors of the content groups of the most-likely section of similar content groups;

selecting a subset of the projected content groups that have a greatest similarity to the received query according to a similarity measure in the destination content group embedding space; and providing at least some content items of the subset of the projected content groups as a response to the received query.

7. The computer-readable medium of claim 6, wherein the similarity measure is a cosine similarity measure.

8. The computer-readable medium of claim 7, wherein mapping the query embedding vector to one or more elements of the destination content group embedding vector results in mapping the elements of the query embedding vector into a fewer number of elements of the partial destination content group embedding vector.

9. The computer-readable medium of claim 6, wherein the at least two different content types include any two or more of audio content types, video content types, image content types, textual content, uniform resource locator (URL) source information, and a filename.

10. The computer-readable medium of claim 9, wherein the received query comprises at least two content items.

11. The computer-readable medium of claim 10, wherein the at least two content items of the received query comprise at least two content types.

12. A computing system for providing content item recommendations in response to a query, the system comprising a processor and a memory, wherein the processor executes instructions stored in the memory as part of or in conjunction with additional components to respond to the query, and configures the computing system to at least:

train a mapping model to identify a mapping by which the mapping model maps an embedding vector of a text query to one or more elements of a destination content group embedding vector of a destination content group embedding space;

section the destination content group embedding space according to a Locality Sensitive Hashing (LSH) function;

receive a text query from a remotely located user over a network;

generate a text query embedding vector for the text query;

map the text query embedding vector to one or more elements of a destination content group embedding vector of the destination content group embedding space according to the mapping of the trained mapping model, the mapping resulting in a partial destination content group embedding vector for the text query;

project the partial destination image content group embedding vector for the text query into the destination content group embedding space;

determine a most-likely section of similar content groups for the partial multi-item embedding vector for the text query:

project content groups of the most-likely section of similar content groups into the destination content group embedding space according to corresponding destination content group embedding vectors of the content groups of the most-likely section of similar content groups, wherein each content group is associated with a corresponding destination content group embedding vector of the destination content group embedding space that is representative of an entirety of a plurality of content items having content items of at least two different content types that form the corresponding destination content group;

select a subset of the projected content groups that have a greatest similarity to the received text query according to a similarity measure in the destination content group embedding space between the projected partial destination content group embedding vector for the text query and the projected destination content group embedding vectors of the corresponding content groups; and provide at least some content groups of the subset of the projected content groups as a recommended response to the received text query.

13. The computing system of claim 12, wherein the similarity measure is a cosine similarity measure.

14. The computing system of claim 12, wherein mapping the text query embedding vector to one or more elements of the destination content group embedding vector of the destination content group embedding space according to the identified mapping of the trained mapping model results in mapping the elements of the query embedding vector into a fewer number of elements of the partial destination content group embedding vector.

* * * * *